Nov. 27, 1956  J. F. McCRORY  2,772,025
LIQUID DISPENSER
Filed Jan. 31, 1955  4 Sheets-Sheet 1
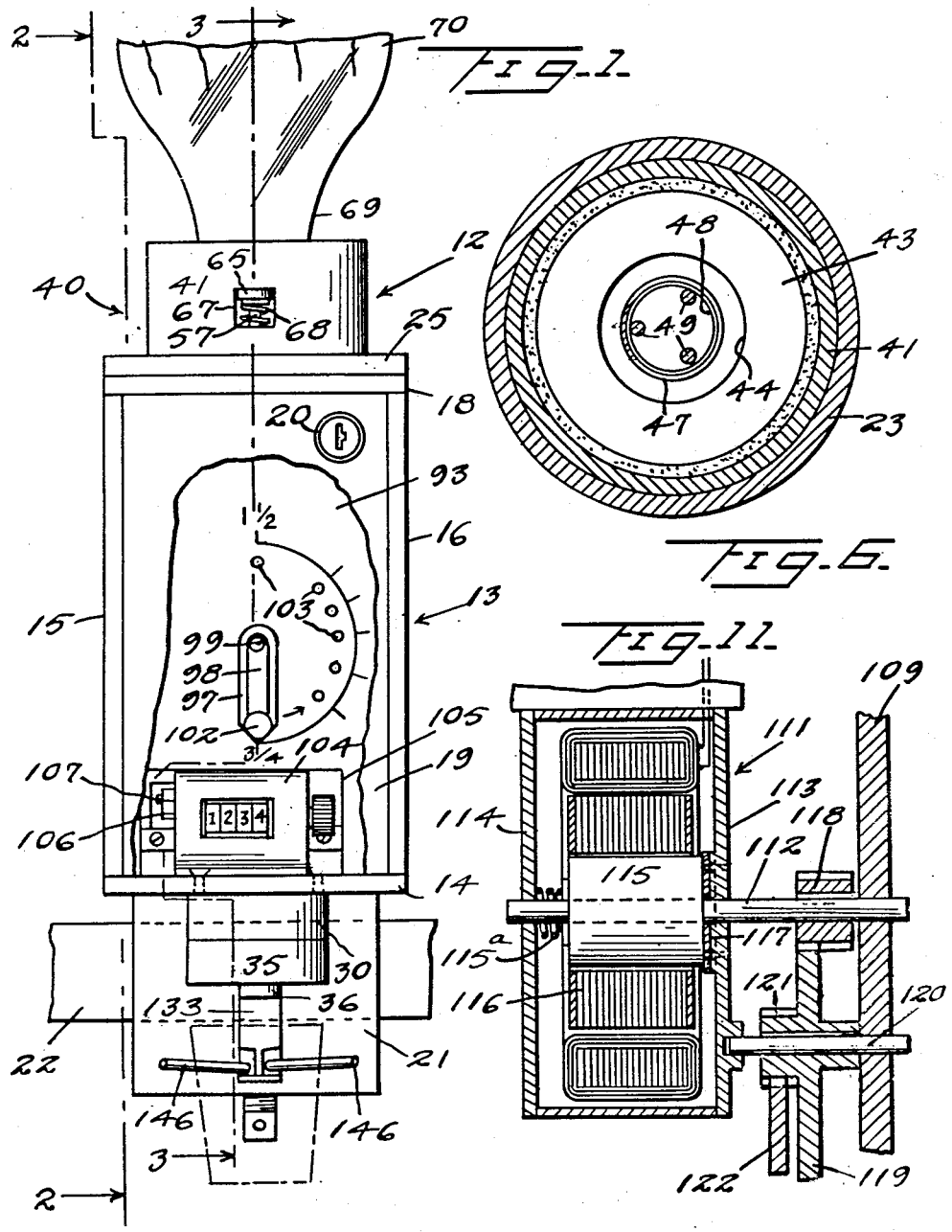
INVENTOR
John F. McCrory
BY John K. Randolph
ATTORNEY

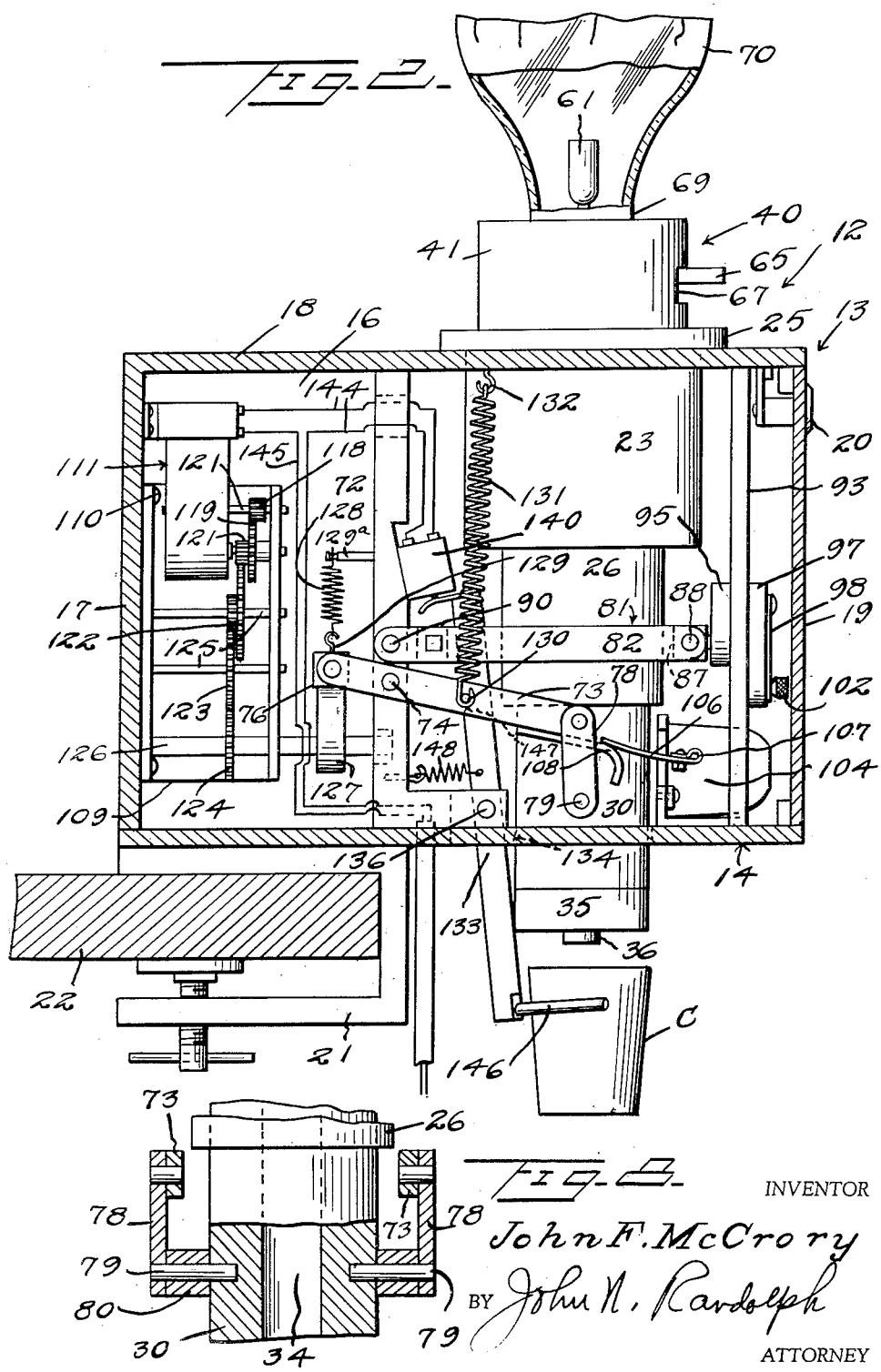

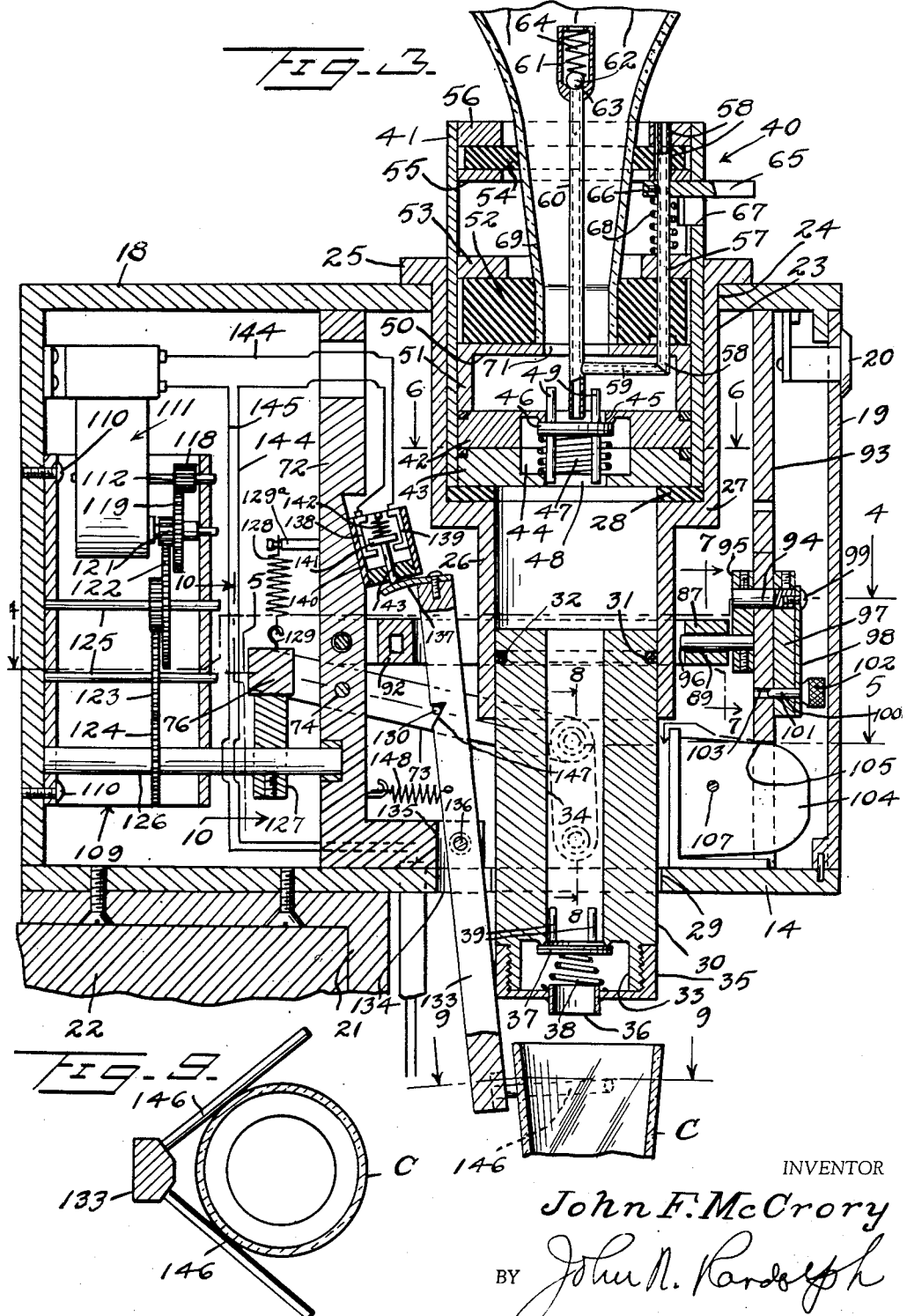

Nov. 27, 1956 J. F. McCRORY 2,772,025
LIQUID DISPENSER
Filed Jan. 31, 1955 4 Sheets-Sheet 4
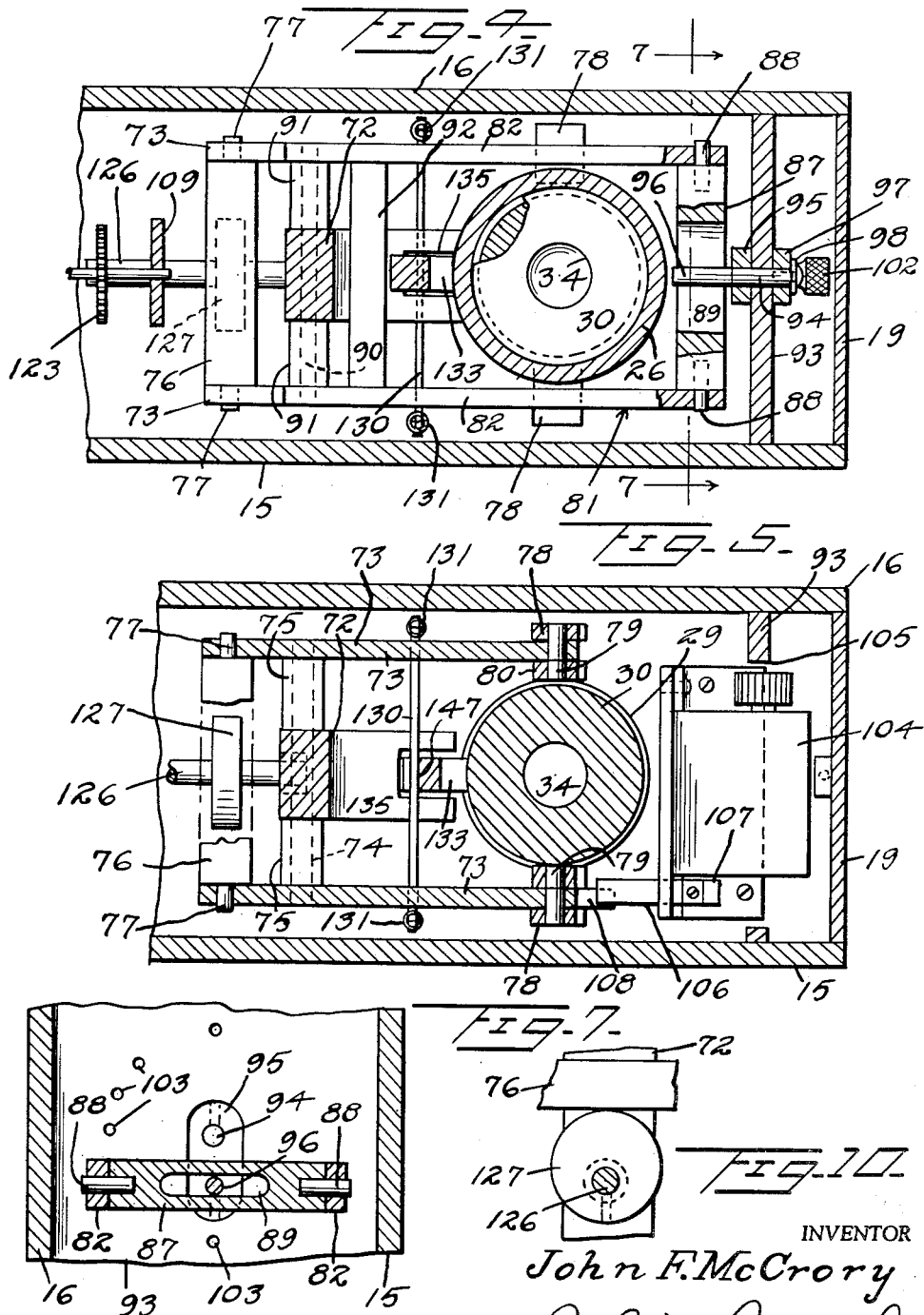
INVENTOR
John F. McCrory
BY John N. Randolph
ATTORNEY

United States Patent Office 2,772,025
Patented Nov. 27, 1956

2,772,025
LIQUID DISPENSER

John F. McCrory, Chula Vista, Calif., assignor, by mesne assignments, to Tru-Measur, Inc., Coronado, Calif., a corporation of California Application January 31, 1955, Serial No. 484,933

14 Claims. (Cl. 222—21)

This invention relates to a liquid dispenser and more particularly to an apparatus for dispensing predetermined measured quantities of a liquid, such as an alcoholic liquor and which will automatically count the number of dispensing operations accomplished by the machine and thus the actual number of drinks dispensed.

A further object of the invention is to provide a device which will automatically and accurately dispense predetermined quantities of a liquid and wherein the amount of liquid dispensed at each cycle of operation of the machine may be varied.

Another object of the invention is to provide a dispenser which will minimize waste prevailing in the practice of other dispensing methods and which will insure uniformity in the quantities of liquid dispensed so long as the machine is set to dispense a predetermined quantity and the quantity setting is not altered.

A further object of the invention is to provide a device which will enable drinks or liquids to be rapidly dispensed in measured quantities within a minimum of time and wherein the possibility of splashing of the liquid from the container into which it is dispensed will be minimized by means which restricts the rate of flow of the liquid.

Still a further object of the invention is to provide a dispenser wherein a change in volume may be accomplished without a cycle lag so that after a resetting of the quantity control the amount corresponding to the new setting will be immediately dispensed upon next operation of the apparatus.

Various other objects and advantages of the invention will hereinafter become more fully apparent from the following description of the drawings, illustrating a presently preferred embodiment thereof, and wherein:

Figure 1 is a front elevational view of the dispensing apparatus, partly broken away;

Figure 2 is a vertical sectional view, partly in elevation thereof, taken substantially along a plane as indicated by the line 2—2 of Figure 1;

Figure 3 is a substantially central vertical sectional view of the dispenser, taken substantially along a plane as indicated by the line 3—3 of Figure 1;

Figure 4 is a fragmentary horizontal sectional view of the apparatus taken substantially along a plane as indicated by the line 4—4 of Figure 3;

Figure 5 is a similar view, taken substantially along a plane as indicated by the line 5—5 of Figure 3;

Figure 6 is an enlarged cross sectional view of a part of the apparatus, taken substantially along a plane as indicated by the line 6—6 of Figure 3;

Figure 7 is a fragmentary vertical sectional view of a portion of the apparatus, taken substantially along planes as indicated by the lines 7—7 of Figures 3 and 4;

Figure 8 is a fragmentary vertical sectional view, partly in elevation of a detail of the apparatus, taken substantially along a plane as indicated by the line 8—8 of Figure 3;

Figure 9 is an enlarged horizontal sectional view, taken substantially along a plane as indicated by the line 9—9 of Figure 3;

Figure 10 is a detail view partially in elevation and partially in section, taken substantially along a plane as indicated by the line 10—10 of Figure 3, and Figure 11 is a fragmentary vertical sectional view, on an enlarged scale, taken through the electric motor and including a part of the reduction gear drive.

Referring more specifically to the invention, the liquid dispenser in its entirety and comprising the invention is designated generally 12 and includes a housing, designated generally 13. The housing 13 has a bottom 14, side walls 15 and 16, a rear wall 17, a top wall 18 and a front wall 19. As best seen in Figures 2 and 3, the front wall 19 is removable and is retained in an applied position by a conventional lock 20 which is unlocked by a key, not shown, to permit detachment of said front wall 19. As best seen in Figure 2, a clamp 21 is secured to the underside of the rear portion of the housing bottom 14 and longitudinally thereof and is adapted to engage a counter or shelf 22 for demountably supporting the dispenser 12 thereon and with a substantial part of the housing 13 overlying an edge of said counter or shelf, as seen in Figures 2 and 3.

As best seen in Figure 3, a relatively large socket member 23 extends downwardly through an opening 24, formed in the top wall 18, near the forward end of the housing 13. Said socket 23 has an outturned flange 25 at its upper end which rests on the top wall 18 around the opening 24. The socket 23 is provided with a restricted extension at its lower end forming a cylinder 26 which is provided with an open lower end and an open upper end which opens into the socket 23. The socket 23 has an annular bottom 27 surrounding the upper end of the cylinder 26, on the upper side of which is mounted an annular washer or gasket 28. The lower end of the cylinder 26 terminates substantially above the bottom 14 and in alignment with an opening 29 thereof through which a piston 30 loosely extends. The piston 30 has an upper portion which slidably fits in the cylinder 26 and which is provided with an annular outwardly opening groove 31 containing a sealing ring 32 which bears against the inner wall of the cylinder 26 to provide a liquid-tight seal between said cylinder and the piston 30. The piston 30 has an annular externally threaded lower end 33 of smaller external diameter than the remainder of said piston and which is normally disposed beneath the housing bottom 14. The piston 30 is provided with a bore 34 extending longitudinally therethrough, the lower end of which opens into the annular piston part 33 and is of substantially smaller diameter than the internal diameter of said part 33. An internally threaded flanged dispensing cap 35 is threadedly mounted on the annular part 33 and has a centrally disposed flanged dispensing opening or boss 36 in the bottom thereof. A valve 37 is disposed in the annular part 33 and is urged upwardly by an expansion coil spring 38 which bears against the underside thereof and against the bottom of the dispensing cap 35, around the boss 36. Guide pins 39 extend from the upper side of the valve 37 and slidably engage in the bore 34 to maintain the valve 37 properly aligned with said bore so that the valve will be maintained properly seated and in a normally closed position around the lower end of the bore 34 by said spring 38.

A bottle closure, designated generally 40, includes a sleeve 41 which fits slidably in the socket 23 and projects from the upper end thereof, as best seen in Figures 2 and 3. Relatively thick upper and lower disks 42 and 43 are secured in the lower part of the sleeve 41 in abutting engagement with one another. The underside of the lower disk 43 is disposed flush with the lower end of the sleeve 41. A part of said underside of the disk 43 and the lower end of the sleeve 41 rest on the gasket 28. The disks 42 and 43 are recessed to provide a central bore 44 extending therethrough having a restricted upper end forming a valve seat 45 against the underside of which normally seats a valve 46 which is disposed in the bore 44. The valve 46 is urged upwardly to a closed position by an expansion coil spring 47 which is contained in the bore 44 and which has an upper end seating against the underside of the valve 46 and a lower end seating on a part of the lower disk 43 around a restricted lower end 48 of the bore 44. The valve 46 has guide pins 49 extending therethrough, upper portions of which extend through the upper restricted bore portion 45 and lower portions of which extend through the spring 47 and the restricted lower bore portion 48 for guiding the valve in its movement between an open or a closed position. The bottle closure 40 includes a partition wall 50 which is disposed above and spaced from the upper side of the upper disk 42 by an annular depending flange 51 which extends downwardly therefrom and rests on said upper disk 42. A lower bottleneck engaging ring or gasket 52 is contained in the sleeve 41 between the partition 50 and a retaining ring 53, which is mounted in said sleeve above the partition 50. The opening of the retaining ring 53 is substantially larger than the opening of the gasket 52, as seen in Figure 3. An upper bottleneck engaging ring or gasket 54 is supported in the upper part of the sleeve 41 by retaining rings 55 and 56 between which said washer or gasket is clamped. The rings 55 and 56 are suitably secured detachably in the upper end of the sleeve 41 and the openings thereof are substantially larger than the opening of the gasket 54. The gaskets 28, 52 and 54 are preferably formed of rubber and are capable of being compressed.

A tube 57 extends slidably through aligned openings or bores 58 in the partition 50, gaskets 52 and 54 and rings 53, 55 and 56. Said tube 57 has an upper end opening to the atmosphere and is provided with a lateral extension 59 at its lower end which extends radially toward the center of the sleeve 41, between the disk 42 and wall 50 and which is connected to and communicates with a central vent tube 60, near to but spaced from a lower end thereof. Said lower end of the vent tube 60 opens into the upper bore portion 45 above and adjacent the valve 46, in the closed position of said valve. The upper end of the vent tube 60 terminates above the upper end of the sleeve 41 in an upwardly opening valve cage 61 containing a ball valve 62 which is urged downwardly to a closed position on the valve seat 63 by an expansion coil spring 64 which bears downwardly thereon and is contained in the upper part of the cage 61. It will thus be seen that the tube 57 and its part 59 form a branch of the main vent tube 60. An actuating handle 65 is adjustably secured to the tube 57 by a setscrew 66, as seen in Figure 3, and projects laterally therefrom loosely through a longitudinally elongated slot 67 in the sleeve 41. The handle 65 is disposed between the rings 53 and 55 and normally against the underside of said ring 55. An expansion coil spring 68 is disposed loosely around a part of the tube 57 and bears against the underside of the handle 65 and on the upper side of the ring 53 for urging the tube 57 and the tube 60 upwardly with respect to the sleeve 41 and so that the lower end of the tube 60 will be normally disposed slightly above and out of contact with the valve 46, to permit said valve to be maintained in a closed position as seen in Figure 3 by its spring 47.

Prior to commencing use of the liquid dispenser 12, the closure unit 40 in its entirety is removed from the socket 23 and is thereafter inverted and applied over the neck 69 of a bottle 70 from which the stopper or cap has been removed, such as a bottle containing an alcoholic beverage. The distal portion of the neck 69 fits snugly in the opening of the gasket 52 and abuts against the upper side of the partition 50 around a central opening 71 therein, which registers with the bore of the neck 69. The gasket 52 is thus compressed by the neck 69. The gasket 54 is likewise compressed by an inner or lower part of the neck 69 which extends snugly therethrough. With the closure 40 thus mounted on the bottleneck 69, the bottle and closure are then inverted and the closure 40 is then reapplied to the socket 23 to assume the position as seen in Figure 3.

An upright supporting member 72 is disposed in the housing 13 and extends between and is secured at its ends to the bottom wall 14 and top wall 18. The support 72 is located between the rear wall 17 and the socket 23, and adjacent the latter. A pair of lever arms 73, which combine to form a lever, have portions straddling the support 72 and are pivotally mounted thereon by a pivot pin or shaft 74 which extends through the support 72 and through complementary portions of the lever arms 73, near to but spaced from rear ends thereof. The lever arms 73 are thus mounted for vertical swinging movement in the housing 13. The lever arms 73 are held spaced from one another a distance greater than the diameter of the cylinder 26 by spacing sleeves 75 which are mounted on the shaft 74 between the upright 72 and said arms 73, as best seen in Figure 5. A crosshead 76, preferably of rectangular or square cross section, is swivelly supported between the rear ends of the lever arms 73 by trunnions 77 which extend from the ends thereof and are journalled in said lever arms. As best seen in Figure 8, links 78 are swingably mounted on and connected to the outer sides of the forward ends of the lever arms 73 and are pivotally connected at their lower ends to the outer ends of pins 79 which extend outwardly from an intermediate portion of the piston 30 and which are disposed in alignment. Spacing sleeves 80 may be mounted on the pins 79 between the piston 30 and the lower portions of the links 78.

An adjustable stop, designated generally 81, includes a pair of spaced arms 82 which loosely straddle the cylinder 26 and between forward ends of which a bar 87 is disposed, as best seen in Figure 4. The bar 87 has pins 88 projecting from the ends thereof and which engage in the forward ends of the arms 82 for supporting the bar 87 therebetween. Said bar 87 has a longitudinally extending slot 89, for a purpose which will hereinafter be described. The rear ends of the arms 82 loosely straddle the support 72 and are swingably connected thereto by a pivot pin 90 which extends through said support 72 and which turnably engages the arms 82. Spacing sleeves 91 are mounted on the pin 90 between the support 72 and said arms 82. The arms 82 of the stop 81 are rigidly connected near to but spaced from their rear ends by a cross brace 92, as seen in Figures 3 and 4.

A front partition wall 93 is mounted in the housing 13 between the socket 23 and the front wall 19, as best seen in Figures 2, 3 and 4. Said partition wall 93 is disposed between the front wall 19 and the forward end of the stop 81. A shaft 94 extends through and is journalled in a part of the wall 93 and has a crank arm 95 adjustably secured to its inner end and disposed on the inner side of the wall 93. A crankpin 96 is fixed to and projects from the crank arm 95 away from the wall 93 in offset relation to the shaft 94 and loosely engages in the slot 89. A lever arm 97 is adjustably fixed to the other end of the shaft 94 and is disposed on the forward side of the wall 93. A leaf spring 98 is secured at one end thereof by a fastening 99 to the forward end of the shaft 94 and is disposed against the forward side of the lever 97. A pin 100, as best seen in Figure 3, is secured to the spring 98, near the free end of said spring, and projects from the inner side thereof loosely through an opening 101 of the lever arm 97. The pin 100 has a head 102 projecting forwardly from the spring 98. As best seen in Figures 1 and 7, the wall 93 has a series of openings 103 equally spaced from the shaft 94 for selectively receiving the distal end of the pin 100, as seen in Figure 3, to latch the arms 95 and 97 in selected adjusted positions. As noted in the drawings, the pin 100 engages the lowermost opening 103, so that the stop 81 is latched in a lowermost position. By pulling outwardly on the head 102, the pin 100 can be disengaged from said bottommost opening 103 permitting the arm 97 to be swung upwardly in a counterclockwise direction as seen in Figure 1. This will cause the shaft 94 and crank 95 to turn in the same direction as the arm 97. Consequently, the crankpin 96 will be swung upwardly with the crank 95 for elevating the bar 87 and accordingly the stop 81 which will swing about its pivot 90. The spring 98 may then be permitted to project the latch pin 100 into any of the other selected keeper openings or recesses 103, for a purpose which will hereinafter be more fully described.

A conventional counter 104 is fixedly mounted in the housing 13 and extends through an opening 105 of the wall 93. An arm 106 is fixed to a shaft 107 which extends laterally from a portion of the counter 104. The arm 106 extends rearwardly from the counter 104 and has a rear free end portion bearing on a strip which is fixed to and forms an extension of one of the lever arms 73, said strip being designated 108. Each time that the strip 108 is swung upwardly with the lever 73, the arm 106 and shaft 107 will be rocked clockwise as seen in Figure 2 to advance the counting mechanism 104 one unit. The arm 106 and shaft 107 will then turn counterclockwise as seen in Figure 2 to return to the position of said parts as illustrated, as the lever 73 swings downwardly and back to its position of Figure 2, and without actuating the counting mechanism and preparatory to again advancing the counting mechanism one unit in the manner as previously described.

A gear casing 109 is mounted in the housing 13, between the rear wall 17 and the support 72, and is secured by fastenings 110 to said rear wall 17.

A conventional electric motor 111 is supported by the upper part of the casing 109 and includes an armature shaft 112 which extends from the motor casing and has a part journalled in a portion of the gear casing 109. Said armature shaft 112 is also journalled in the front and rear walls 113 and 114, respectively, of the housing of the motor 111, as seen in Figure 11, and includes an enlarged portion 115 which is loosely disposed between said walls 113 and 114 and which additionally forms an electromagnet core. A winding 116 is disposed around said core 115 and is energized simultaneously with the motor winding so that when the armature shaft 112 of the motor is driven it will additionally be displaced slightly from right to left from its position of Figure 11 as the core 115 is magnetized. An expansion coil spring 115a is disposed between the wall 114 and the adjacent end of the core 115 for urging said core and the shaft 112 from left to right when the motor 111 is de-energized. The right hand end of the core 115 is thus displaced into engagement with a friction brake member 117 which is secured to the inner side of the wall 113 around the armature shaft 112 to thus immediately interrupt rotation of the armature shaft. A pinion 118 is fixed to the armature shaft 112 and is disposed in meshing engagement with the gear 119 in different positions of axial movement of the shaft 112. The gear 119 is journalled on a shaft 120 which is supported by a part of the casing 109 and the wall 113. Said gear is provided on one side thereof with a small pinion 121 which meshes with a similar gear and pinion unit 122, which drives a gear 123 which in turn meshes with and drives a gear 124. The gears 122 and 123 are journalled on other shafts 125 which are supported by the casing 109 or may be fixed to said shafts, in which case the shafts 125 are journalled in the casing 109. The last mentioned gear 124 is fixed to a shaft 126 which is journalled in the casing 109 and has a forward end journalled in the support 72. An eccentric 127 is fixed to the shaft 126 beneath the crosshead 76 which bears thereon.

The crosshead 76 is urged upwardly by a contractile coil spring 128, the lower end of which is connected to a hook 129 which is fixed to said crosshead, and the upper end of which is connected to a stud 129a which is secured to the support 72, for urging the crosshead and the rear end of the lever 73 upwardly. A rod 130 extends through and outwardly from the lever arms 73 between the support 72 and the cylinder 26. The lower ends of a pair of contractile coil springs 131 are connected to the end portions of the rod 130 and straddle the lever arms 73. The upper ends of the springs 131 are anchored to the top wall 18 by hooks 132. The springs 131 are of sufficient strength to overcome the spring 128 and to swing the lever 73 upwardly about its pivot 74.

An elongated lever 133, forming a trigger, extends loosely through an opening 134 in the bottom 14, as best seen in Figure 3. The support 72 has a bifurcated forwardly projecting extension 135 at its lower end in which a part of the lever 133 is swingably supported on a pivot pin 136 which extends loosely therethrough and through said bifurcated portion 135. The trigger 133 extends upwardly between the arms 73 and also between the arms 82 and has a strip 137 of substantially rigid material fixed to and extending rearwardly from its upper end. The strip 136 is inclined downwardly and rearwardly.

An electric switch is supported on the support 72 above the trigger 133 and includes spaced electrical insulated contacts 138 and 139 mounted in a housing of electrical insulating material 140. A conductor bridge 141 is urged downwardly by a spring 142 into engagement with portions of the contacts 138 and 139 to bridge the gap therebetween. Said bridge 141 has a stem 143 extending downwardly therefrom and from the switch housing 140 and which normally bears on the strip 137 to hold the bridge 141 in an elevated position out of engagement with the contacts 138 and 139 to thus maintain the switch in an open position. The electric motor 111 is connected to a suitable source of electric current, such as a domestic electric outlet by electrical conductors 144 and 145. The electric switch is interposed in the conductor wire 144 by spaced portions thereof being connected to the two stationary contacts 138 and 139.

The other, lower end of the trigger 133 extends downwardly to below the dispensing cap 35 and is provided at its lower end with a pair of rods 146, as best seen in Figure 9, which project forwardly therefrom in diverging relation to one another and which are disposed beneath the cap 35. Said lower portion of the trigger 133 and the piston 30 are disposed forwardly of the clamp 21 and the counter or shelf 22, to which said clamp is secured. The trigger 133, between its upper end and its pivot 136 is provided with a downwardly and rearwardly opening notch 147 which engages the rod 130, as best seen in Figure 3, when the lever 73 is in a lowermost position. A contractile coil spring 148 extends between and is connected to the support 72 and the trigger 133, above the pivot 136 to urge the upper portion of the trigger rearwardly, by rocking movement of said trigger about its pivot 136 in a counterclockwise direction as seen in Figures 2 and 3, for urging the notch 147 into engagement with the rod 130.

Assuming that the closure 40 with the bottle 70 applied thereto has been inserted into the socket 23, as illustrated in Figure 3, the handle 65 is displaced downwardly against the action of the spring 68 to thus displace the tubes 57 and 60 downwardly so that the lower end of the tube 60 will depress and unseat the valve 46. This will permit the liquid from the bottle 70 to flow downwardly by gravity through the bore 44 to fill the upper portion of the cylinder 26 and the piston bore 34. The air from the cylinder 26 and piston bore 34 will pass upwardly into the bottle 70 to replace the liquid released therefrom. The spring 38 is of sufficient strength to support the valve 37 in a closed position when the bore 34 and cylinder 26 are filled with the liquid. Pressure on the handle 65 is then released permitting the spring 68 to displace the tubes 57 and 60 upwardly to their normal positions of Figure 3 and thus allowing the spring 47 to return the valve 46 to its closed position.

Assuming that the quantity regulating arm 97 is latched by the pin 100 in a selected position for supporting the stop 81 so that liquid in a desired quantity will be dispensed at each operation of the dispenser 12, a glass or similar container C is placed under the discharge port 36 in engagement with the rods 146, as illustrated in Figures 3 and 9 and is pressed against said rods for swinging the trigger 133 clockwise as seen in Figure 3 about its pivot 136. When this occurs, the trigger 133 will swing to substantially an upright position and in so moving, the strip 137 will disengage the stem 143 and the notch 147 will disengage the rod 130. When this occurs, the spring 142 will displace the conductor bridge 141 into engagement with the switch contacts 138 and 139 to complete the electric circuit to the electric motor 111. The core 115 will be magnetized and will be displaced from right to left against the spring 115a, as seen in Figure 11, for disengaging said core from the brake element 117 to permit free operation of the armature shaft 112. Said shaft will be revolved for driving the shaft 126 at a substantially reduced R. P. M. through the gear train 118, 119, 120, 122, 123, 124. As the shaft 126 slowly turns, a portion of the eccentric, which is disposed remote therefrom and upon which the crosshead 76 bears, will move downwardly, thus permitting the springs 131 to swing the forward or right hand end of the lever 73, as seen in Figure 2, upwardly, since the notch 147 is out of engagement with the rod 130. As said forward end of the lever 73 swings upwardly, the links 78 will exert an upward pull on the piston 30, thus causing the piston to move upwardly in the cylinder 26 for restricting the chamber thereof and so that the pressure of the liquid within said chamber and in the bore 34 will unseat and open the valve 37 to permit dispensing of the liquid into the container C in an amount corresponding to the reduction in volume of the chamber of the cylinder 26 due to the upward displacement of the piston 30. As the eccentric 127 approaches its one half cycle of rotation, the lever 73 will contact the stop 81 which will prevent further upward movement of said lever 73 or the piston 30 under the biasing action of the springs 131. The lever 73 will be held by the springs 131 with the forward portion of the arms thereof in this upward extremity of their movement against the stop 81 while the eccentric 127 moves out of contact with the block 76, completes the first half of its cycle of rotation and commences the last half thereof. During this time, the rod 130 will engage the rear edge of the trigger 133 to retain the strip 137 out of engagement with the stem 143 so that the switch 138, 139 will remain closed. During the latter part of its cycle of rotation, the eccentric 127 will displace the block 76 upwardly for rocking the lever 73 clockwise and back to its position of Figures 2 and 3. As the eccentric 127 reaches its top dead center position of Figures 2 and 3, the rod 130 will be disposed to be received in the notch 147 and the spring 148 will then swing the trigger 133 counterclockwise and back to its position of Figures 2 and 3. As this occurs, the strip 137 will move beneath and cam the stem 143 upwardly for lifting the conductor bridge 141 out of engagement with the contacts 138 and 139 to thus de-energize the electric motor 111. As soon as this occurs, the spring 115a will displace the core 115 from left to right as seen in Figure 11 into engagement with the braking element 117 to immediately stop rotation of the shaft 112 to thus prevent the eccentric 127 from passing its top dead center position, as seen in Figure 10. The container C may be removed from beneath the discharge port 36 as soon as the dispensing operation is completed. This occurs when the piston 30 has completed its upward movement or pumping stroke. Accordingly, the container C will not prevent the trigger 133 from returning to a position to latch the lever 73 as the piston completes its downward or suction stroke.

As the piston 30 is displaced downwardly the valve 37 will have been closed by the spring 38 and a vacuum will be created in the cylinder 26 and bore 34. This will cause the valve 46 to open against the action of the spring 47 so that additional liquid from the bottle 70 may flow through the bore 44 to refill the cylinder 26 and bore 34, after which the spring 47 will return the valve 46 to its closed position. While the liquid is thus being dispensed from the bottle, the vacuum in the bottle will cause the ball valve 62 to be unseated against the action of the spring 64 permitting air to enter the bottle from the atmosphere through the tubes 57, 59 and 60 to replace the dispensed liquid, after which the valve 62 will return to a closed position.

Each time that the piston 30 is displaced upwardly, as previously described to dispense a measured quantity of a liquid into a container disposed beneath the discharge port 36, the shaft 107 will be rocked clockwise, as previously described for advancing the counting mechanism one unit. It should be noted that it is not necessary that the container C be held tightly against the rods 146 during the dispensing cycle, since the rod 130 will maintain the strip 137 out of engagement with the stem 143 while the shaft 126 and eccentric 127 completes a revolution.

It is desirable that the eccentric 127 be stopped in its top dead center position of Figure 10 so that the piston 30 will be drawn upwardly slowly commencing with the initial movement thereof so that the liquid will be dispensed from the port 36 during the entire period that the piston is moving upwardly. Thus, no gushing of the liquid from the port 36 will occur and consequently the liquid will not splash from the container C.

Obviously, by releasing the latch pin 100 and swinging the parts 97 and 95 upwardly in a counterclockwise direction from their positions of Figures 1 and 2, will result in swinging the stop 81 upwardly and thus permitting the forward end of the lever 73 to swing further upwardly before striking the stop, thereby increasing the extent that the piston 30 is displaced upwardly. Thus, the amount of liquid dispensed will be increased. It will also be apparent that the volume control 97, 100 can be set and the front wall 19 thereafter locked in place so that the setting of the volume of liquid dispensed at each operation of the machine cannot be changed by an unauthorized person. This will also exclude unauthorized persons from the counting mechanism 104 to prevent tampering therewith. Thus, an accurate check can be obtained on the number of drinks served from each bottle.

Various modifications and changes are contemplated and may obviously be resorted to, without departing from the spirit or scope of the invention as hereinafter defined by the appended claims.

I claim as my invention:

1. A dispenser of the character described comprising a housing, a cylinder disposed in said housing and having an open lower end, a piston having a lower discharge end extending downwardly from said housing and an upper end extending slidably into the lower end of said cylinder, said piston having a passage extending longitudinally therethrough, spring actuated means connected to said housing and piston for urging the piston inwardly of the cylinder, a downwardly opening valve mounted in said passage, spring means normally maintaining said valve in a closed position, a supply source for a medium to be dispensed, means connecting said supply source to the other upper end of said cylinder, a driven means engaging said spring actuated means and normally holding the spring actuated means in a position to prevent the piston from being displaced upwardly thereby, and means to actuate said driven means for movement thereof to permit upward displacement of the piston by said spring actuated means for applying a pressure to the medium to be dispensed contained within said cylinder for unseating the valve for discharge of the medium from the lower end of said piston passage, said driven means subsequently returning the spring actuated means to its initial position for displacing the piston downward to close said valve and create a vacuum in said cylinder for refilling the cylinder from said supply source.

2. A dispenser as in claim 1, said means for connecting the cylinder and supply source comprising a combination holder and closure, said supply source comprising a container having an open discharge end on which said holder and closure is detachably secured, means supporting said holder and closure demountably in the housing above said cylinder and with said container supported thereabove and positioned with the discharge end thereof opening downwardly, said holder having a passage connecting the cylinder and container, when said holder is supported by the housing, through which the medium to be dispensed is supplied to said cylinder for replacing the medium dispensed therefrom by upward movement of the piston.

3. A dispenser as in claim 2, and a downwardly opening check valve mounted in the holder passage to prevent gravity flow of the medium to be dispensed through said holder into the cylinder.

4. A dispenser as in claim 3, vent means carried by said holder having one end opening to the atmosphere and an opposite end opening into said container, a check valve carried by said vent means and opening inwardly of the container, and manually engageable means for displacing said vent means downwardly for causing a portion of the vent means to engage and unseat the check valve of said holder passage for initially charging the cylinder by gravity with the medium to be dispensed.

5. A dispenser as in claim 1, a manually adjustable stop disposed in said housing and limiting movement of said spring actuated means in a direction for displacing the piston inwardly of the cylinder and whereby the extent of movement of the piston inwardly of the cylinder can be varied for varying the volume of the medium dispensed from the piston on each upward or pumping stroke thereof.

6. A dispenser of the character as defined by claim 1, a counter actuating element carried by a part of said spring actuated means, and a counter disposed in said housing including a part disposed to be engaged and actuated by said actuating element on each pumping stroke of the piston for counting the dispensing operations performed by the dispenser.

7. A dispenser as in claim 6, said housing having a removable normally locked closure forming one wall thereof and removable to provide access to said counter and the manually adjustable stop.

8. A dispenser as in claim 1, an electric drive for said driven means including an electric motor, a normally closed switch for energizing and de-energizing said electric motor, said means to actuate the driven means comprising a trigger pivotally supported by the housing having an exposed lower end adapted to be engaged by a container positioned beneath the piston for rocking said trigger in one direction, said trigger having a part carried by the other upper end thereof and movable out of engagement with said switch by movement of the trigger in the aforementioned direction to permit closing of the switch and energizing of said electric motor, spring means urging said trigger back to its initial position to de-energize the electric motor, and means carried by said spring actuated means and engaging said trigger to prevent return of the trigger to its initial position until completion of the suction or downstroke of the piston.

9. A dispenser as in claim 8, said last mentioned means forming a latch to prevent upward displacement of the piston from its lowermost position by said spring actuated means until the trigger is manually rocked in said first mentioned direction of swinging movement.

10. A dispenser as in claim 9, said electric motor being provided with a brake for resisting operation thereof, solenoid means for disengaging said brake when the electric motor is energized and whereby rotation of said eccentric will be promptly interrupted by de-energizing of the electric motor for stopping the eccentric in a top dead center position so that the eccentric will function as a governor to retard movement of said spring actuated means on the pumping stroke of the piston to prevent squirting of the pumped medium from the discharge end of the piston into the container.

11. A liquid dispenser comprising a housing, a pump contained in said housing comprising a cylinder secured to the housing and a piston, said piston being slidably disposed in and extending from a lower end of said cylinder and having a lower end extending downwardly from the housing, said piston having a discharge passage extending longitudinally therethrough, a downwardly opening check valve disposed in the piston passage, a container having an open dispensing neck, a closure and holder detachably secured over said dispensing neck and detachably mounted in said housing above and in communication with the upper end of said cylinder for supporting the container in an inverted position with the dispensing neck opening downward, said holder and closure having a passage connecting the dispensing neck and cylinder, a downwardly opening check valve for closing said holder passage, a lever fulcrumed in said housing having a forward portion connected to the piston, spring means urging said forward portion of the lever upwardly for displacing the piston upwardly into the cylinder to accomplish a pumping stroke of the piston, an eccentric rotatably mounted in said housing beneath and bearing against a rear portion of the lever, electrically driven means disposed in said housing and connected to the eccentric for displacing the eccentric downwardly to permit the forward end of said lever and the piston to be elevated by said spring means for unseating the check valve of the piston passage for dispensing a portion of the contents of the cylinder from the lower end of said piston, said eccentric thereafter returning the lever and piston to the initial positions thereof during the upward travel of the eccentric and whereby said piston is displaced outwardly of the cylinder for creating a suction in the cylinder for unseating the check valve of the holder and closure to permit a portion of the contents of said container to be drawn into the cylinder.

12. A dispenser as in claim 11, an electric switch for energizing and de-energizing said electrically driven means, a trigger pivotally mounted in said housing and having an upper end normally disposed in engagement with a part of said switch for maintaining the switch in a circuit interrupting position, said trigger having a lower end disposed beneath the lower end of said piston and adapted to be engaged by a receptacle when placed beneath said piston for rocking the lever to move the upper end thereof out of engagement with the switch to permit the switch to assume a circuit closing position for energizing the electrically driven means to revolve said eccentric, and said lever and trigger having coacting means to prevent the trigger returning to a position to open said switch until said eccentric has completed a revolution.

13. A dispenser as in claim 12, said last mentioned means forming a latch for latching the forward portion of said lever in a lowermost position of its swinging movement when the upper portion of said trigger is disposed in engagement with said switch part.

14. A dispenser as in claim 13, a stop adjustably disposed above the forward portion of said lever in the path of movement thereof to limit upward movement of the forward portion of the lever and said piston under the biasing action of said spring means for regulating the length of the pumping stroke of the piston and the amount of the pumped medium dispensed from the pump on each pumping stroke thereof, and manually actuated means for setting said adjustable stop in different positions above the forward portion of said lever.

References Cited in the file of this patent

UNITED STATES PATENTS

| | | |
|---|---|---|
| 1,018,924 | Patnaude | Feb. 27, 1912 |
| 1,973,709 | Hibbert et al. | Sept. 18, 1934 |
| 2,554,570 | Harvey | May 29, 1951 |
| 2,605,021 | Churchill et al. | July 29, 1952 |
| 2,689,669 | Ericson | Sept. 21, 1954 |